United States Patent
Adam et al.

(10) Patent No.: US 9,020,247 B2
(45) Date of Patent: Apr. 28, 2015

(54) LANDMARKS FROM DIGITAL PHOTO COLLECTIONS

(71) Applicant: Google Inc., Mountain View, CA (US)

(72) Inventors: Hartwig Adam, Los Angeles, CA (US); Li Zhang, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/759,916

(22) Filed: Feb. 5, 2013

(65) Prior Publication Data

US 2013/0202198 A1     Aug. 8, 2013

Related U.S. Application Data

(63) Continuation of application No. 12/466,880, filed on May 15, 2009, now Pat. No. 8,396,287.

(51) Int. Cl.
| | |
|---|---|
| *G06K 9/62* | (2006.01) |
| *G06K 9/00* | (2006.01) |
| *G06K 9/46* | (2006.01) |
| *G06K 9/60* | (2006.01) |
| *G06F 7/00* | (2006.01) |
| *G06F 17/30* | (2006.01) |

(52) U.S. Cl.
CPC ............ *G06K 9/46* (2013.01); *G06F 17/30244* (2013.01); *G06F 17/30247* (2013.01); *G06F 17/30265* (2013.01)

(58) Field of Classification Search
USPC ........... 382/159, 160, 103, 203, 305; 707/711
See application file for complete search history.

(56) References Cited

U.S. PATENT DOCUMENTS

| | | | |
|---|---|---|---|
| 6,580,811 B2 | 6/2003 | Maurer et al. | |
| 6,711,293 B1 | 3/2004 | Lowe | |
| 7,340,458 B2 | 3/2008 | Vaithilingam et al. | |
| 7,353,114 B1 | 4/2008 | Rohlf et al. | |
| 7,702,185 B2 | 4/2010 | Keating et al. | |
| 7,840,558 B2 | 11/2010 | Wiseman et al. | |
| 7,870,227 B2 | 1/2011 | Patel et al. | |
| 8,027,832 B2 * | 9/2011 | Ramsey et al. | 704/9 |

(Continued)

FOREIGN PATENT DOCUMENTS

| | | |
|---|---|---|
| EP | 1921853 A1 | 5/2008 |
| JP | 1995168855 A | 7/1995 |

(Continued)

OTHER PUBLICATIONS

Batur et al., "Adaptive active appearance models" Nov. 2005, IEEE Transactions on Image Processing, vol. 14, No. 11., pp. 1707-1721.

(Continued)

*Primary Examiner* — Kathleen Y Dulaney

(57) ABSTRACT

Methods and systems for automatic detection of landmarks in digital images and annotation of those images are disclosed. A method for detecting and annotating landmarks in digital images includes the steps of automatically assigning a tag descriptive of a landmark to one or more images in a plurality of text-associated digital images to generate a set of landmark-tagged images, learning an appearance model for the landmark from the set of landmark-tagged images, and detecting the landmark in a new digital image using the appearance model. The method can also include a step of annotating the new image with the tag descriptive of the landmark.

20 Claims, 6 Drawing Sheets

(56) References Cited

U.S. PATENT DOCUMENTS

| | | | |
|---|---|---|---|
| 8,037,011 | B2 | 10/2011 | Gadanho et al. |
| 2004/0064334 | A1 | 4/2004 | Nye |
| 2005/0021202 | A1 | 1/2005 | Russell et al. |
| 2005/0027492 | A1 | 2/2005 | Taylor et al. |
| 2005/0036712 | A1 | 2/2005 | Wada |
| 2006/0015496 | A1 | 1/2006 | Keating et al. |
| 2006/0015497 | A1 | 1/2006 | Keating et al. |
| 2006/0020597 | A1 | 1/2006 | Keating et al. |
| 2006/0095521 | A1 | 5/2006 | Patinkin |
| 2006/0095540 | A1 | 5/2006 | Anderson et al. |
| 2007/0110316 | A1 | 5/2007 | Ohashi |
| 2007/0115373 | A1 | 5/2007 | Gallagher et al. |
| 2007/0154115 | A1 | 7/2007 | Yoo |
| 2007/0174269 | A1 | 7/2007 | Jing et al. |
| 2007/0208776 | A1 | 9/2007 | Perry et al. |
| 2008/0005091 | A1 | 1/2008 | Lawler et al. |
| 2008/0080745 | A1 | 4/2008 | Vanhoucke et al. |
| 2008/0104040 | A1 | 5/2008 | Ramakrishna |
| 2008/0118160 | A1 | 5/2008 | Fan et al. |
| 2008/0140644 | A1 | 6/2008 | Franks et al. |
| 2008/0162469 | A1 | 7/2008 | Terayoko |
| 2008/0268876 | A1 | 10/2008 | Gelfand et al. |
| 2008/0310759 | A1 | 12/2008 | Liu et al. |
| 2009/0049408 | A1 | 2/2009 | Naaman et al. |
| 2009/0143977 | A1 | 6/2009 | Beletski et al. |
| 2009/0171568 | A1 | 7/2009 | McQuaide, Jr. |
| 2009/0216794 | A1 | 8/2009 | Saptharishi |
| 2009/0290812 | A1 | 11/2009 | Naaman et al. |
| 2009/0292685 | A1 | 11/2009 | Liu et al. |
| 2009/0297012 | A1 | 12/2009 | Brett et al. |

FOREIGN PATENT DOCUMENTS

| | | | |
|---|---|---|---|
| JP | 10134042 | A | 5/1998 |
| JP | 2011328194 | A | 11/1999 |
| JP | 2002259976 | A | 9/2002 |
| JP | 2002010178 | A | 11/2002 |
| JP | 2004021717 | A | 1/2004 |
| JP | 2007507775 | A | 3/2007 |
| JP | 2007142672 | A | 6/2007 |
| JP | 2007197368 | A | 8/2007 |
| JP | 2007316876 | A | 12/2007 |
| JP | 2007334505 | A | 12/2007 |
| JP | 200833399 | A | 2/2008 |
| JP | 2008129942 | A | 6/2008 |
| JP | 2008165303 | A | 7/2008 |
| JP | 2009526302 | A | 7/2009 |
| WO | 2006055514 | A1 | 5/2006 |
| WO | 2007013432 | A1 | 2/2007 |
| WO | WO2008055120 | A2 | 5/2008 |
| WO | 2008152805 | A1 | 12/2008 |

OTHER PUBLICATIONS

International Search Report, dated Sep. 7, 2010 for PCT Application No. PCT/US2010/034930.

Kennedy et al., "Generating diverse and representative image search results for landmarks," Proc. of the 17th international conference on the World Wide Web, Beijing, China, Apr. 2008, pp. 297-306.

Li et al., "Modeling and recognition of landmark image collections using iconic scene graphs", Proceedings of ECCV 2008, Lecture Notes in Computer Science, Springer, Oct. 12, 2008, pp. 427-440.

Takeuchu, "Evaluation of image-based landmark recognition techniques", Technical Report CMU-RI-TR-98-20, Carnegie Mellon University, Jul. 1, 1998, pp. 1-16.

Toyama et al., "Geographic location tags on digital images", Nov. 2003, ACM, pp. 156-166.

Tsai et al., "Extent: Inferring image meta data from context and content", Proc. IEEE International Conference on Multimedia and Expo, 2005, pp. 1154-1157.

Written Opinion, dated Sep. 7, 2010 for PCT Application No. PCT/US2010/034930.

Office Action, dated Dec. 3, 2013, for related Japanese Patent Application No. 2012-511045.

Office Action, dated Jan. 17, 2014, for related Chinese Patent Application No. 201080030849.3.

Office Action, dated Apr. 9, 2014, for related Japanese Patent Application No. 2012-511045.

Office Action, dated Jul. 10, 2014, for related Chinese Patent Application No. 201080030849.3.

Vu et al., "Image Retrieval Based on Regions of Interest," IEEE Transactions on Knowledge and Data Engineering, Jul. 2003.

Kandel et al., "Photospread: A Spreadsheet for Managing Photos," ACM Proc. Chi. Apr. 5, 2008.

Final Rejection, dated Nov. 8, 2012, for related U.S. Appl. No. 12/119,359.

Non-Final Rejection, dated Jun. 4, 2013, for related U.S. Appl. No. 12/119,359.

Non-Final Rejection, dated May 21, 2012, for related U.S. Appl. No. 12/119,359.

Final Rejection, dated Nov. 10, 2011, for related U.S. Appl. No. 12/119,359.

Ahern et al., "World Explorer: visualizing aggregate data from unstructured text in geo-referenced collections" JCDL '07, Jun. 17-22, 2007, Canada.

Non-Final Rejection, dated Jun. 17, 2011, for related U.S. Appl. No. 12/119,359.

International Search Report and Written Opinion, dated Mar. 2, 2010, for PCT Application No. PCT/US2009/002916.

Maurer et al., "Tracking and Learning Graphs of Image Sequences of Faces," Proceedings of International Conference on Artificial Neural Networks at Bochum, 2006.

Lowe et al., "Distinctive Image Features from Scale-Invariant Keypoints," International Journal of Computer Vision, 2004.

Gronau et al., "Optimal Implementations of UPGMA and Other Common Clustering Algorithms," Information Processing Letters, 2007.

Lindeberg et al., "On Scale Selection for Differential Operators," Proc. 8th Scandinavian Conference on Image Analysis, 1993.

U.S. Appl. No. 12/049,841, filed Mar. 17, 2008, entitled "Systems and Methods for Descrptor Vector Computation."

U.S. Appl. No. 12/183,613, filed Jul. 31, 2008, entitled "Clustering Images Using an Image Region Graph."

Non-Final Rejection, Dated Sep. 2, 2014, for U.S. Appl. No. 13/619,652.

Kennedy et al., "How Flickr Helps us Make Sense of the World: Context and Content in Community-Contributed Media Collections" MM' 07, 2007.

Office Action, dated Jan. 30, 2014, for related Chinese Patent Application No. 200980127106.5.

Final Rejection, dated Mar. 25, 2014, for U.S. Appl. No. 13/619,652.

Non-Final Rejection, dated Nov. 6, 2013, for U.S. Appl. No. 13/619,652.

Yamada et al., "A sightseeing contents delivery system," Report of Technical Study by the Institute of Electronics, Information and Communication Engineers, Japan, 2005.

Office Action, dated Aug. 24, 2012, for related Chinese Patent Application No. 200980127106.5.

Office Action, dated May 24, 2013, for related Chinese Patent Application No. 200980127106.5.

Office Action, dated Oct. 30, 2014, for related Japanese Patent Application No. 2014-021923.

Office Action, dated Oct. 2, 2014, for related European Patent Application No. 10 724 937.7.

\* cited by examiner

LANDMARKS FROM DIGITAL PHOTO COLLECTIONS

CROSS REFERENCE TO RELATED APPLICATIONS

This application is a continuation of, and claims priority to, U.S. patent application Ser. No. 12/466,880, filed May 15, 2009, the entire content of which is incorporated herein by reference.

BACKGROUND

1. Technical Field

The present invention relates generally to digital image collections, and more particularly to identifying popular landmarks in large digital image collections.

2. Background Art

With the increased use of digital images, increased digital storage capacity, and interconnectivity offered by digital media such as the Internet, ever larger corpora of digital images are accessible to an increasing number of people. Persons having a range of interests, from various locations spread throughout the world, take photographs of various subjects and make those photographs available for others to view, for instance, on the Internet. For example, digital photographs of various landmarks and tourist sites from across the world may be posted on the web by persons with different levels of skill in taking photographs. Such photographs may show the same landmark from different perspectives, under different conditions, and/or from different distances.

The vast number of such images available can be useful as an indicator of, or guide to, popular landmarks. To leverage information contained in these large corpora of digital images, it is necessary that the corpora be organized. For example, at digital image web sites such as Picasa Web Albums (from Google Inc., Mountain View, Calif.), starting at a high level menu, one may drill down to a detailed listing of subjects for which photographs are available. Alternatively, one may be able to search one or more sites that have digital photographs. Some tourist information websites, for example, have downloaded images of landmarks associated with published lists of popular tourist sites.

Most conventional digital photograph organizing systems rely on users to tag photographs. As numerous new photographs are added to these digital image collections, it may not be feasible for users to manually label the photographs in a complete and consistent manner that will increase the usefulness of those digital image collections. A system that can automatically extract information such as the most popular tourist destinations) from these large collections is described in U.S. patent application Ser. No. 12/119,359 titled "Automatic Discovery of Popular Landmarks," also assigned to Google. Inc., California. The system described in application Ser. No. 12/119,359 uses a processing pipeline comprising a clustering stage based on geo-coding, and a clustering stage based on matching visual features of the images. What is needed, however, are other approaches to automatically discover landmarks and annotate images containing landmarks.

SUMMARY

Methods and systems for automatic detection of landmarks in digital images, and annotation of those images, are disclosed. In one embodiment, a method for detecting and annotating landmarks in digital images includes the steps of automatically assigning a tag, descriptive of a landmark, to one or more images in a plurality of text-associated digital images. This generates a set of landmark-tagged images. An appearance model can be learned for the landmark from the set of landmark-tagged images. This allows detection of the landmark in a new digital image using the appearance model. The method can also include a step of annotating the new image with the tag descriptive of the landmark.

Another embodiment is a system for automatically detecting and annotating landmarks in digital images. The system has at least one collection of text-associated digital images stored in a memory medium and at least one processor communicatively coupled to the medium. The processors are configured to automatically assign a tag descriptive of a landmark to one or more images in a plurality of text-associated digital images. This generates a set of landmark-tagged images. An appearance model can be learned for the landmark from the set of landmark-tagged images. This allows detection of the landmark in a new digital image using the appearance model.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION

Figure 1:
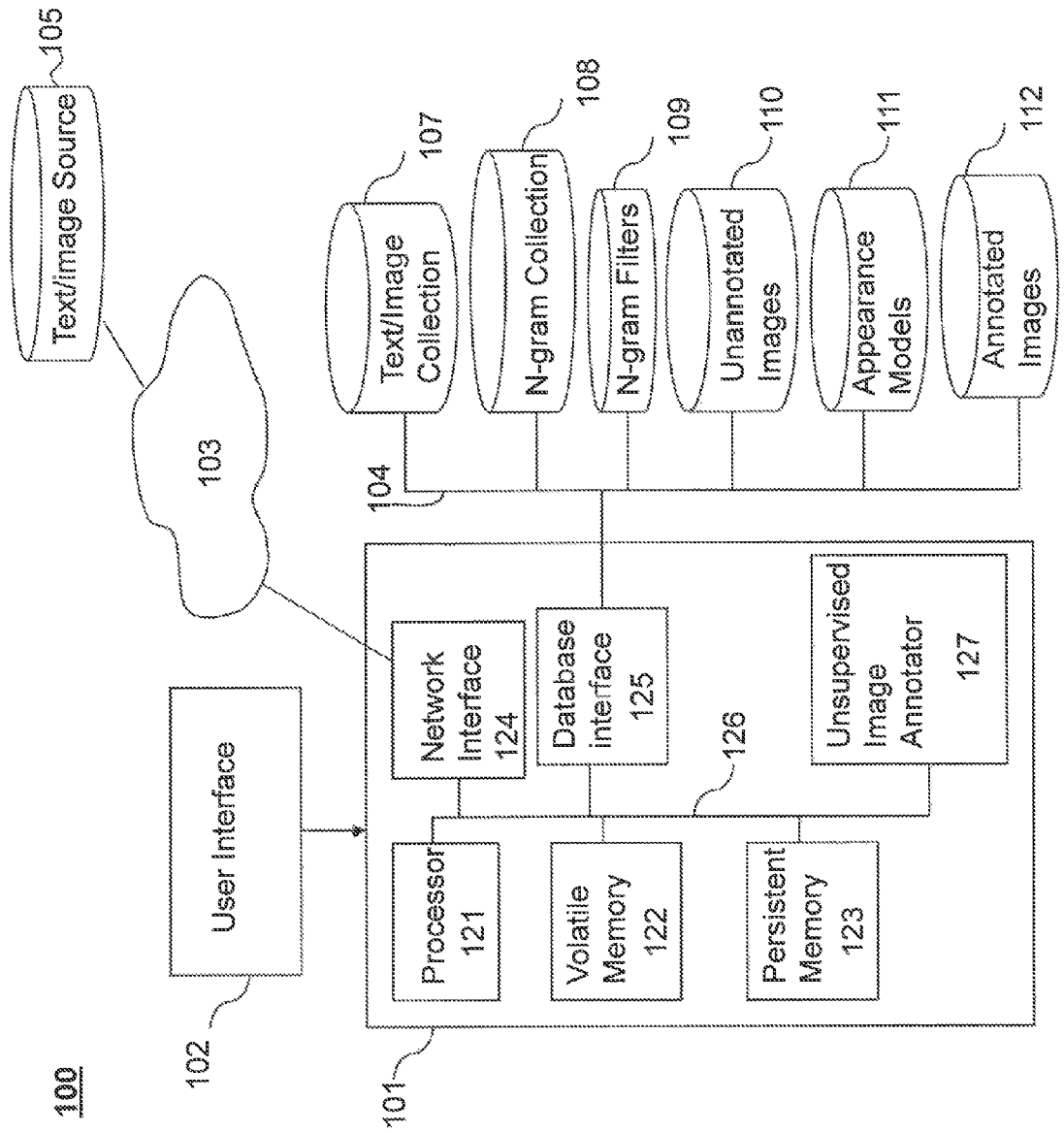
FIG. 1 shows a system for the automatic detection of landmarks in digital images, according to an embodiment of the present invention.

While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

Overview

The present invention includes methods and systems for automatically identifying and classifying objects in digital images. For example, embodiments of the present invention may identify, classify and prioritize most popular tourist landmarks based on digital image collections that are accessible on the Internet. The method and systems of the present invention can enable the efficient maintenance of an up-to-date list and collections of images for the most popular tourist locations. In some embodiments, the popularity of a tourist location can be approximated based on the number of images of that location posted on the Internet by users.

Numerous individuals take digital photographs of surroundings in their neighborhoods, locations visited in their day-to-day activities, and sites visited on their touristic travels. The cameras that are used are of various levels of quality and sophistication. The individuals who capture the images are of various skill levels. The images are captured from various angles, in varied levels alighting, with varied levels of surrounding visual noise, in various weather conditions, etc. Many of these images are then posted on photo sharing websites or made digitally available through other means. Access to a vast collection of digital images, such as digital photographs, is made available through networks such as the Internet.

Often, users who post images online also annotate the posted images, for example, by adding one or more tags and/or captions. A tag can be used to name an image. Tags can also be assigned to images to assign keywords that relate to an image. For example, an image of the Eiffel Tower may have assigned to it the tags "Eiffel Tower," "Paris," "France," "Europe," "summer," or the name of a person who is shown to be posing in front of the Tower. Tags are valuable as organization tools at various levels of granularity: "France" may be useful in order to classify the image under searches for landmarks in France, while having only "Eiffel Tower" as a tag could exclude the image from searches for landmarks in "Paris" and/or "France," Despite the variation in accuracy and usefulness of the tags of images in determining landmarks contained in those images, the corpora of user-tagged images are a source of valuable information for purposes of building automatic landmark recognition systems.

Other potential sources of information include various other documents and electronic sources that link, text and images. For example, magazine articles about the Eiffel Tower may include a photograph of its subject. Newspaper content, magazine and journal content, articles written and/or posted by individuals including blog postings about various landmarks, etc., often include images that are directly tied to the textual description. Images having recognizable landmark associated text can be referred to as landmark-tagged images.

Embodiments of the present invention leverage several types of data available regarding images in order to obtain information about popular landmarks. For example, geo-tags, text tags, author information, timestamps (e.g., time or origin), and visual match information, are some of the types of information that are utilized in embodiments of the present invention. Some of this information is available with each image (e.g., in EXIF tags associated with the image). Other information is either user assigned, or algorithmically assigned. When taken individually each of these data types can have substantial weaknesses. For example, geo-location data (e.g., geo-tags) are generally based on the location of the camera and not the landmark that is being photographed. Also, in some cases the geo-location information is based on user provided information such as city name and may therefore not be accurate. Text tags, provided by authors and third parties, may not accurately describe the landmark. Author information for each image can be based on a camera identifier, a person who captures the image, or a person who uploads the image to a web site. Visual match information can also be erroneous in situations such as when several landmarks exist in a small area, when landmarks look alike, and/or when image quality is not sufficient. Embodiments of the present invention, therefore, leverage several types of available information to obtain a high degree of landmark detection and accurate annotation in digital images.

System for Automatic Landmark Recognition and Annotation

A system 100 for building a database of annotated popular landmark images according to an embodiment of the present invention is shown in FIG. 1. System 100 includes a computer 101, a user interface 102, networks 103 and 104, a text/image document collection 107, an n-gram collection 108, n-gram filters database 109, database of un-annotated images 110, database of appearance models 111, annotated images 112, and text/image sources 105. A person of skill in the art will appreciate that system 100 can include more, less, or different components and modules than those listed above while still being consistent with the present invention.

Computer 101 may include one or more computers, servers, or like computing devices, that are interconnected by a communication medium. For example, computer 101 can comprise one or more commercially available computing servers that are coupled by one or more local area network, such as an Ethernet network, Gigabit Ethernet network, WIFI network, or the like. A computer 101 includes a processor 121, volatile memory 122, persistent memory 123, network interface 124, database interface 125, a communication medium 126 to couple modules of computer 101, and an unsupervised image annotator module 127. Processor 121 can include one or more commercially available central processing units (CPU), graphics processor units (GPU), field programmable gate array (FPGA), digital signal processors (DSP), and application specific integrated circuits (ASIC). Processor 121 controls processing within computer 101, receiving inputs and outputting data into or from computer 101. For example, the processing logic of unsupervised image annotator module 127 can be executed on processor 121.

Volatile memory 122 can include a volatile memory such as dynamic random access memory (DRAM), static random access memory (SRAM), or the like. Volatile memory 122 can be used to store configuration parameters, source data and intermediate results of the processing of module 127. Configuration parameters can include connection information for text/image sources 105, and other parameters that configure the operation of, for example, processing of unsupervised image annotator module 127. Persistent memory 123 can include one or more non-volatile memory devices such as magnetic disk, optical disk, flash memory, read only memory (ROM), or the like. Persistent memory 123 can be used for storing the logic instructions for unsupervised image annotator module 127, configuration parameters, and to store intermediate and other results of the processing in module 127.

Network interface 124 can include the functionality to communicate with entities connected to computer 101 through networks including network 103, such as text/image sources 105. For example, network interface 124 can include processing components including Internet Protocol (IP) and Hyper-Text Transfer Protocol (HTTP) processing such that enables computer 101 to connect to text/image sources 105 to obtain text and image information. For example, HTTP protocol processing machine software can be implemented as part of network interface 124. Database interface 125 includes the functionality to connect computer 101 to one or more databases used in processing images for landmarks according to embodiments of the present invention. It should be noted that the use of the term "database" does not necessarily refer to a database management system (DBMS), but rather encompasses any collection of data. Database interface 125 therefore can include DBMS functionality to connect to one or more DBMS systems comprising one or more databases 107-112 or processing logic to communicate with the type of database of each type of database 107-112. Communication medium 126 can connect modules of computer 101, including modules 121-125 and 127. Communication medium 126 can include a communication devices such as a PCI bus, USB, Ethernet, or the like.

Unsupervised image annotator module 127 includes the functionality to identify landmarks, generate appearance models for selected landmarks, and to annotate images according to an embodiment of the present invention. Landmarks contained in images can be identified based on explicit tags already associated with the image, or through algorithmic means as described below. The functionality of unsupervised image annotator module 127 can be implemented in software, firmware, hardware, or any combination thereof. In one embodiment, processing logic for the functionality of unsupervised image annotator module 127 can be implemented in a computer programming language or script language such as C, C++, Assembly, Java, JavaScript, Perl, or the like.

Networks 103 can include a means of connecting computer 101 to one or more text/image sources 105. Network 104 can include a means of connecting computer 101 to one or more databases 107-112. Networks 103 and 104 can include one or more network mediums including peripheral connections such as USB, FireWire, or local area networks such as Ethernet, WIFI, or wide area networks such as a PSTN or Internet. In one embodiment, network 103 includes the Internet, and network 104 includes an Ethernet based local area network.

User interface 102 can be connected to one or more computers 101 using any one or a combination of interconnection mechanisms such as PCI bus, IEEE 1394 Firewire interface, Ethernet interface, an IEEE 802.11 interface, or the like. User interface 102 allows a user or other external entity to interact with computer 101. In some embodiments, one or more databases 107-112 can also be interacted with through user interface 102. One or more of a graphical user interface, a web interface, and application programming interface may be included in user interface 130.

Text/image sources 105 can include various types of digital document collections that include images of landmarks and associated text (e.g., landmark-tagged images). In one embodiment, text/image sources 105 include one or more photo collections that have photos associated with captions and tags. Captions, as used herein, refer to a title assigned to a photo. Tags, as used herein, refer to one or more words or phrases assigned to a photo. Often, captions as well as the tags are assigned by the author (e.g., originator of the photograph, or person uploading the photograph to a photosharing website) of the photograph. However, captions and tags can also be assigned to a photograph by a third party, or an automated tool. Unless each is identified separately, the term "tag" in the following description includes tags as well as captions.

Text/image sources 105 can also include collections of hypertext documents that hyperlink images to documents (and vice versa), and can also include newspaper corpora, magazine and journal corpora, blog archives, digital libraries having digitized books, third-party annotated photo depositories, and personal and business web sites. For example, tourism and/or travel-related websites, digital travel guides, city websites, etc. are some resources that generally includes images of landmarks and descriptions of those landmarks. However, any collection of digital data where a correlation between one or more images and associated text can be drawn can be included in text/image sources 105.

Text/image collection 107 is a database where, in some embodiments, local copies and/or modified versions of text/image data originally accessed in remote text/image sources 105 are saved, for example, for more convenient and reliable access for processing by unsupervised image annotator 127. For example, because accessing data and images in text/image sources 105 over network 103, which can be a wide area network such as the Internet, may involve long latencies, there may be a process (not shown) in computer 101 that makes copies of such data and images in a local or locally attached network location such as in text/image collection 107. Text/image collection 107 can also include collections of images that are already tagged, for example, user photo collections in Picasa Web Albums and/or image collections already processed according to teachings in the present invention. In some embodiments, text/image collection 107 can include a data structure corresponding to each image, in which the data structure includes one or more pointers to images and/or documents in text/image sources 105, for example, to avoid having to create a separate copy of the image and/or documents from text/image sources 105.

N-gram collection 108 is a database that includes a collection of n-grams. N-grams can be extracted from captions, tags, or text documents associated with images in, for example, text/image collection 107 or text/image sources 105. As used herein an n-gram is a sequence of one or more words. The selection of n-grams can be done using methods similar to one or more of several techniques used, for example, in text analysis. The selection and extraction of n-grams, according to embodiments of this invention, is further described below.

N-gram filters database 109 includes one or more lists of n-grams to be filtered out of n-gram collection 108, and/or one or more filtering rules to be applied to n-gram collection 108. For example, one list in n-gram filters database 109 can be a "bad words list" where the n-grams appearing in the bad words list are not extracted from text/image collections 107, or text/image sources 105, and are removed from n-gram collection 108 if they are found to be present. Another list may be a list of n-grams that occur too frequently in image associated text, and therefore are of little value as landmark identifiers. Words such as "the" and "of" can be considered in this category. Another list can be a list of phrases, that are known to appear too frequently and are therefore not sufficiently useful as discriminatory landmark identifiers.

Unannotated images database 110 includes images that are yet to be annotated (e.g., tagged) according to embodiments of the present invention. For example, unannotated images database 110 can include the =tagged digital images uploaded by one or more users in order to be processed using an embodiment of the present invention.

Appearance models database ill holds the recognition models, herein referred to as appearance models, that are derived in order to recognize landmarks in images, for example, images in unannotated images database 110.

Annotated images database 112 contains the images that are annotated according to embodiments of the present invention. For example, images from unannotated images database 110 are stored in annotated images database 112, after they are processed by unsupervised image annotator 127 according to an embodiment of the present invention. A person of skill in the art will recognize that although databases 107-112 are described as separate databases above, databases 107-112 can be arranged and/or implemented in various ways consistent with the present invention.

Figure 2:
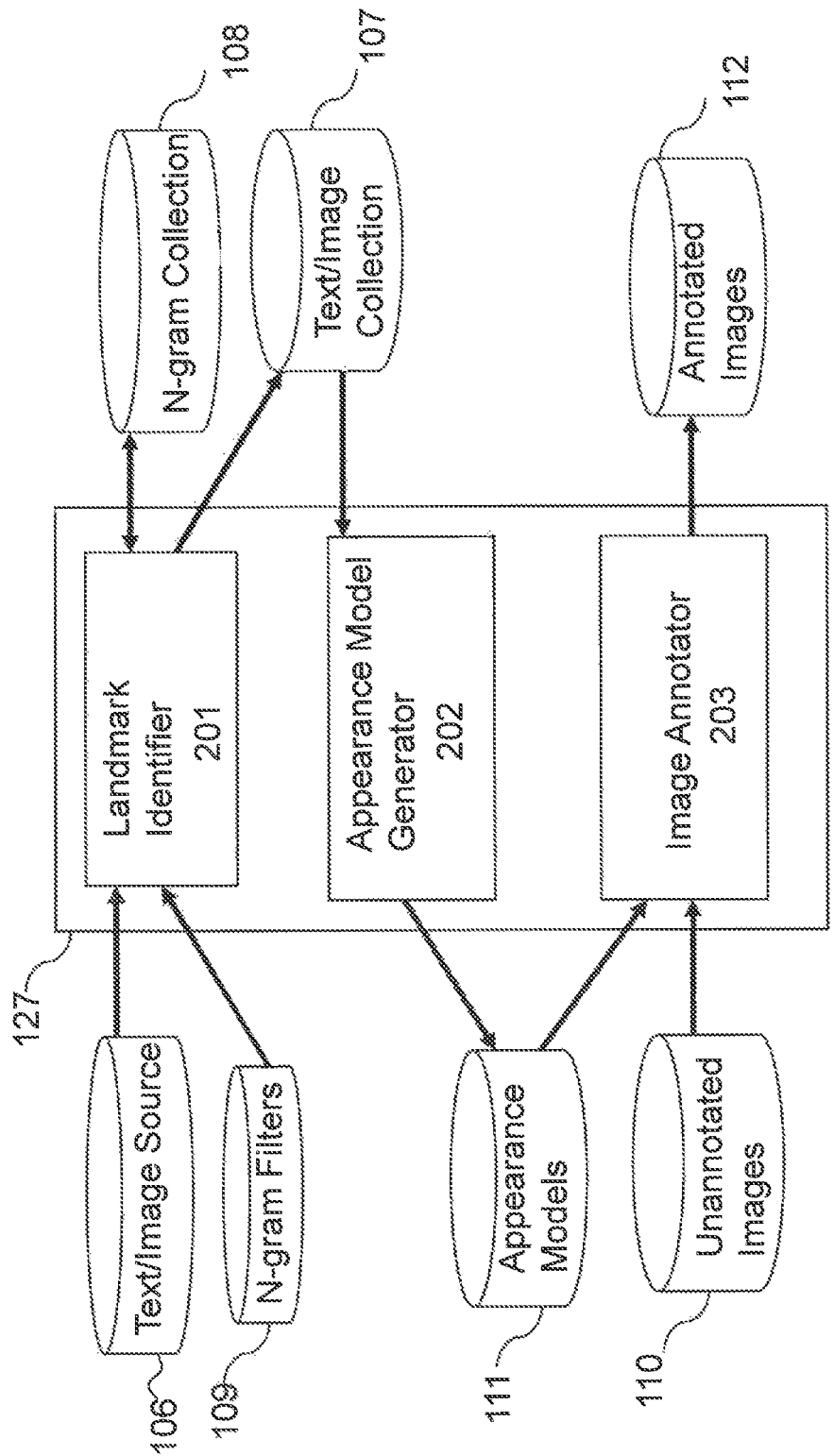
FIG. 2 shows more details of a component of the system of FIG. 1, according to an embodiment of the present invention.

FIG. 2 shows more details of unsupervised image annotator module 127, according to an embodiment of the present invention. In this embodiment, unsupervised image annotator module 127 includes three processing modules: a landmark identifier 201, an appearance model generator 202, and an image annotator 203. Modules 201, 202, and 203 can be implemented in software, firmware, hardware, or a combination thereof. In one embodiment, modules 201-203 are implemented in software using the C++ programming language. In one embodiment, a computer program product may have logic including the computer program logic of modules 201-203 recorded on a computer readable medium such as a hard disk, flash disk, or other form of storage.

Landmark identifier module 201 includes the functionality to identify landmarks in text/image collections 107 and/or text/image sources 105. Landmark identifier module 201 can, in one embodiment, use images and associated text from text/image sources 105 as input, and copy such images and associated text to text/image collection 107. Landmark identifier module 201 can also analyze the text in text/image sources 105 while using and updating n-grams collection 108. N-gram filters database 109 can also be used in the processing within landmark identifier module 201.

Appearance model generator 202 includes the functionality to generate one or more appearance models for each landmark that is, for example, identified by landmark identifier module 201. In one example, appearance model generator 202 can take as input the images and identified landmarks in text/image collection 107, and generate one or more appearance models for each of the landmarks. The generated appearance models can be written to appearance models database 111.

An appearance model, as used herein, is a template to be used in the automatic recognition of certain common features in images. In one embodiment of the present invention, an appearance model used for the recognition of a landmark can include a feature vector comprising numerical scores for a set of predetermined image features. Methods of object recognition in images and of generating feature vectors are well known in the art. For example, methods of object recognition in images are described in David G. Lowe, "Object recognition from local scale-invariant features," *International Conference on Computer Vision*, Corfu, Greece (September 1999), pp. 1150-1157. In addition to the visual recognition components, an appearance model can also include information such as geo-location information for the corresponding landmark. For example, the geo-location information in the appearance model for a particular landmark can specify a geographic point and/or a geographic area. Specifying a geographic area can reduce uncertainties created due to the variance in accuracy of the geo-location information of images.

Image annotator module 203 includes the functionality to automatically recognize landmarks in images and appropriately annotate such images with information identifying the one or more corresponding landmarks. In one embodiment, image annotator module 203 can use appearance models from appearance models database 111 to automatically recognize landmarks in images from unannotated images database 110. The images can then be annotated, for example by associating one or more tags, according to the recognized landmarks in each image and the annotated images can be written to annotated images database 112.

Method for Automatic Landmark Recognition and Annotation

Figure 3:
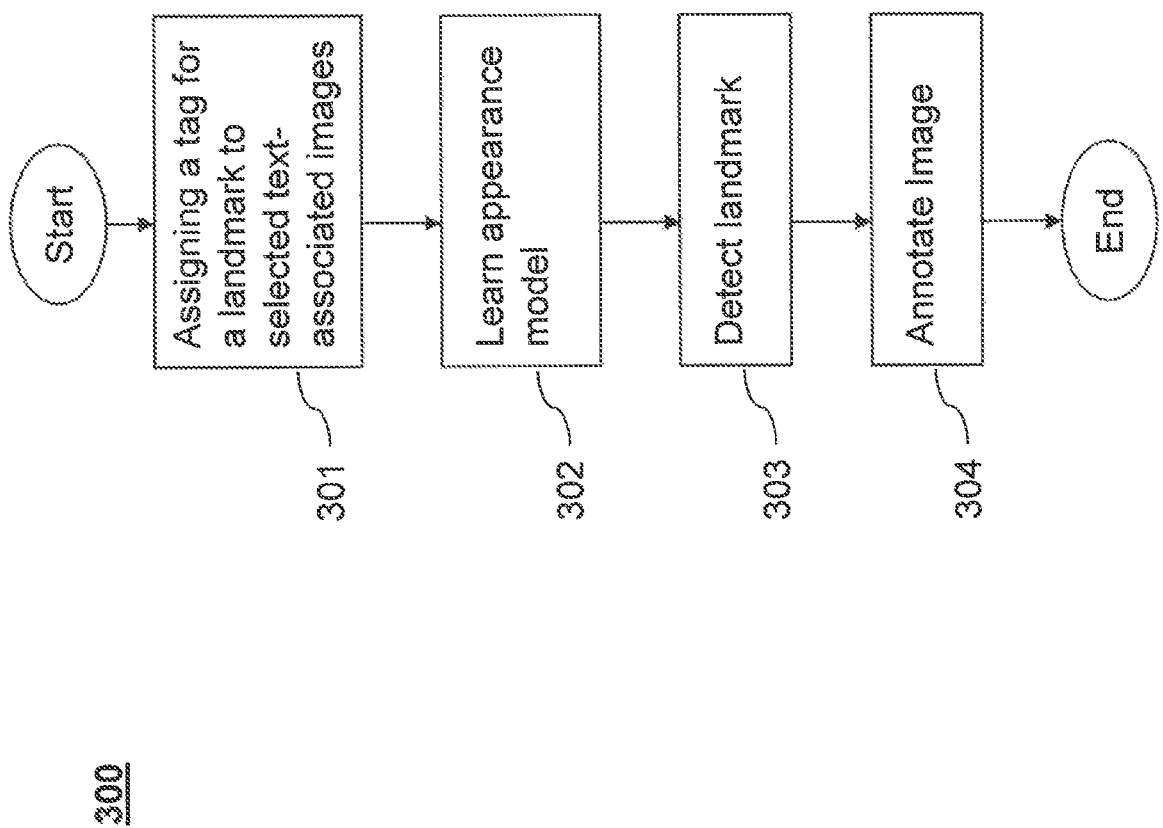
FIG. 3 is a process to automatically detect landmarks in digital images and annotate digital images according to an embodiment of the present invention.

FIG. 3 shows a process 300 that annotates an image that includes one or more popular landmarks, according to an embodiment of the present invention. Process 300 can be implemented, for example, in unsupervised image annotator module 127. Steps 301-304 of process 300 can be implemented in landmark identifier module 201, appearance model generator module 202, and image annotator module 203, as appropriate. A person of skill in the art will understand that the functionality described herein with respect to process 300 can be implemented using modules 201-203 in ways other than that described below. For example, in one embodiment, landmark identifier module 201, appearance model generator module 202, and image annotator module 203, can each be separate processes that together implement process 300. In another embodiment, landmark identifier module 201, appearance model generator module 202, and image annotator module 203, can each be a separate thread that together implement process 300. In yet another embodiment, landmark identifier module 201, appearance model generator module 202, and image annotator module 203, can all be implemented as a single process implementing process 300.

In step 301, images and text associated with those images are analyzed to identify landmarks, particularly popular landmarks. Popular landmarks, in general, are those landmarks that appear most frequently in the analyzed image/text sources, such as text/image sources 105. The input to the processing in step 301, in one embodiment, is one or more image/text sources accessible to the one or more computers on which process 300 is being executed. For example, process 300 can be executing on computer 101 and can have accessibility to text/image sources 105 over a network 103. The output from step 301, according to one embodiment, can be a selected set of images, identified landmarks in those images, and associated text and n-grams. For example, the output of step 301 can be written into text/image collection 107. Step 301 is further described with respect to FIGS. 4-6 below.

In step 302, one or more appearance models are derived or learned for landmarks identified in step 301. A person skilled in the art will recognize that one of many methods may be used to learn an appearance model from the landmark-tagged images obtained as a result of step 301. According to one embodiment, the appearance model for a particular landmark comprises a feature vector that numerically quantifies one or more visual aspects of one or more images considered to contain the particular landmark. As described earlier feature vector generation is well known in the art and an approach for feature vector generation, such as that can be used in the present invention, is described in David G. Lowe, "Object recognition from local scale-invariant features," cited above. The feature vector, for example, ideally includes a substantial number of features that are relatively invariant to the numerous varying conditions such as camera distance, camera angle, image quality, lighting conditions, etc. In some embodiments of the present invention, the one or more appearance models corresponding to a particular image can also include non-visual aspects of an image such as geo-location information. An appearance model can include any information, including visual characteristics of the particular landmark and geo-location information, that can be used in automatically recognizing the existence of that landmark in images.

In step 303, the one or more appearance models obtained in step 302 are used to detect a corresponding landmark in images. In one embodiment, one or more appearance models in appearance model database 111 are used in the detection of a corresponding landmark in unannotated images 110 database. For example, feature vectors of an appearance model from appearance models database 111 can be compared to feature vectors generated for the image from unannotated images database 110 that is being considered. If the feature vectors match beyond a predetermined threshold level, the image being considered is recognized to include the landmark that corresponds to the matched appearance model. Object recognition technology, such as that can be used in step 303 in an embodiment of the present invention, is generally well known. One approach to object recognition that can be used in the present invention is described in Lowe, "Object recognition from local scale-invariant features," cited above.

In step 304, the image being analyzed can be annotated if it is determined to have within it, a particular landmark corresponding to the one or more appearance models that were used in the detection, for example, in step 303. Annotated images and the respective annotations can be written to annotated images database 112. The annotation associated with an annotated image can include text associated with each one of the appearance models that were found to have a match in that annotated image. It is also contemplated that the annotations associated with the annotated image can include text or phrases based on additional processing of the text associated with the corresponding appearance models. For example, in an embodiment in which the text associated with the corresponding appearance models are of the form of simple tags such as "Statue of David," and "Rome," step 304 may include additional processing to generate a sentence such as "Statute of David in Rome, Italy," "Statue of David in Palacio Veccio, Rome, Italy," or the like.

Figure 4:
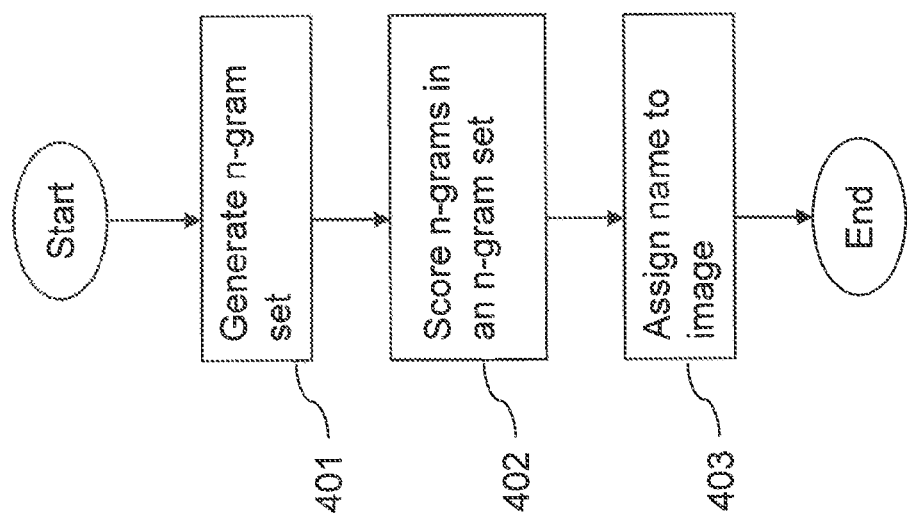
FIG. 4 is a process for assigning a tag for a landmark to selected text-associated images, according to an embodiment of the present invention.

In FIG. 4, processing involved in step 301 is shown in further detail. The functionality of step 301 includes steps 401-403. In step 401, an n-gram set of words or phrases descriptive of landmarks is generated and/or an existing n-gram set is updated. For example, step 401 can take as input text/image sources 105 and produce as output n-grams in n-gram collection 108. A more detailed description of step 401, as in how one or more n-grams descriptive of landmarks are generated is provided below in relation to FIG. 5.

In step 402, a set of n-grams that are preliminarily considered as being useful for landmark determination is scored. For example, the initial set of n-grams considered in step 402, can be the set of n-grams derived from text/image sources 105 in step 401. The processing of step 402 can create a list of n-grams in n-gram collection 108. The n-grams are filtered according to various criteria including having each n-gram scored and keeping only a predetermined number of n-grams with the highest scores. An n-gram score S(k) is assigned to each of the n-grams N(k) in n-gram collection 108. A method of determining S(k) is described below. Processing of step 402, is further described with respect to FIG. 6 below.

In step 403, images are assigned tags from n-gam collection 108. For example, for each pair of image and n-gram combination, a pairing-score can be assigned. The pairing-score can be defined such that the higher valued pairing-scores imply strongly related image and n-gram pairs. In one example, the pairing formed by image I(i) from image/text collection 107 and the n-gram N(k) from n-gram collection 108, can be assigned a pairing-score defined by the product of the strength L(i,k) of the link between I(i) and N(k) and the n-gram score of N(k), i.e., L(i,k)*S(k). A method of determining L(i,k) is described below. A list of candidate n-grams can be generated by focusing on the n-grams with high pairing-scores, and truncating the list appropriately. In one instance, the list can be truncated when the pairing-score falls lower than half of the highest pairing-score in the list. In this manner, each image can be assigned the most relevant n-grams.

Figure 5:
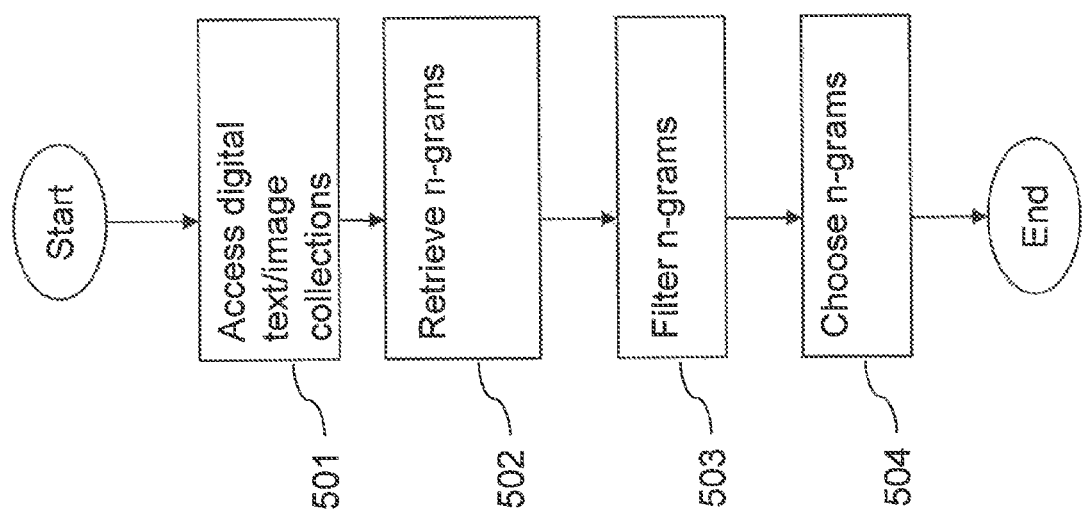
FIG. 5 is a process to generate a list of n-grams based on text-associated images, according to an embodiment of the present invention.

FIG. 5 shows processing steps 501-504 in the generation of the set of n-grams according to step 401 described above. In step 501, one or more text/image sources 105 is accessed, for example, by landmark identifier module 201. Accessing of text/image sources 105 can include connecting to such sources either over a local network, or a wide area network such as the Internet. The text/image sources 105 that are selected to be processed can be identified based on various methods such as input from users or operators, automatic identification and classification of web sited by program components (e.g., identification of photo repository web sites by web bots), or a list of websites or other repositories that are monitored for content. Methods of connecting to sources such as text/image sources 105 are well known. Where necessary, an implementation of the present invention should also consider aspects of copyrights, privacy, etc., that may be involved in the use of images owned by various parties.

In step 502, a list of potential landmark descriptor n-grams are retrieved from text associated with images in text/image sources 105. The extraction of n-grams from photo repositories where photos are associated with tags and/or captions can include the collection of the set of tags and/or captions associated with photos of the photo repositories of text/image source 105. When image/text sources include other documents and/or content that associates images with corresponding text, one or more of numerous text analysis methods can be used to extract terms (tags) that potentially correspond to landmarks. For example, a text associated with an image in a tourism website can be automatically analyzed using a method well-known in the art such as term-frequency-inverse document frequency (TF-IDF) over the text available to identify potential tags. In one embodiment, TF-IDF is applied to the tags associated with photos in a photo repository from a text/image source 105.

Predetermined rules can be applied to determine a narrowed and/or filtered set of tags that refer to landmarks from the potentially large number of available tags. For example, in step 503, one or more filtering rules or criteria can be applied to the set of n-grams of potential landmark descriptors collected in step 502. One filter that can be applied to the list of potential landmark descriptor n-grams is a bad words filter. The bad words filter includes a list of n-grams and phrases that are predetermined as bad and/or unhelpful to discriminate among landmarks. Another filter that is applied can be a stop word list. The stop word list can include n-grams that are expected to Occur so frequently in tags and/or descriptors that they are unlikely to be helpful as landmark descriptors. Words such as "of," "the," and "and" are example n-grams that can be included in a stop word list. Another filter that can be applied is a minimum reliability measure, such as a minimum number of authors filter. The minimum number of authors filter can be used to remove any n-grams from the list of potential landmark descriptor n-grams that have less than a predetermined number of unique authors using those n-grams in their tags. For example, it may be predetermined that for any n-gram to be included in n-gram collection 108, the n-gram Should be detected in the tags used by three or more unique authors.

Figure 6:
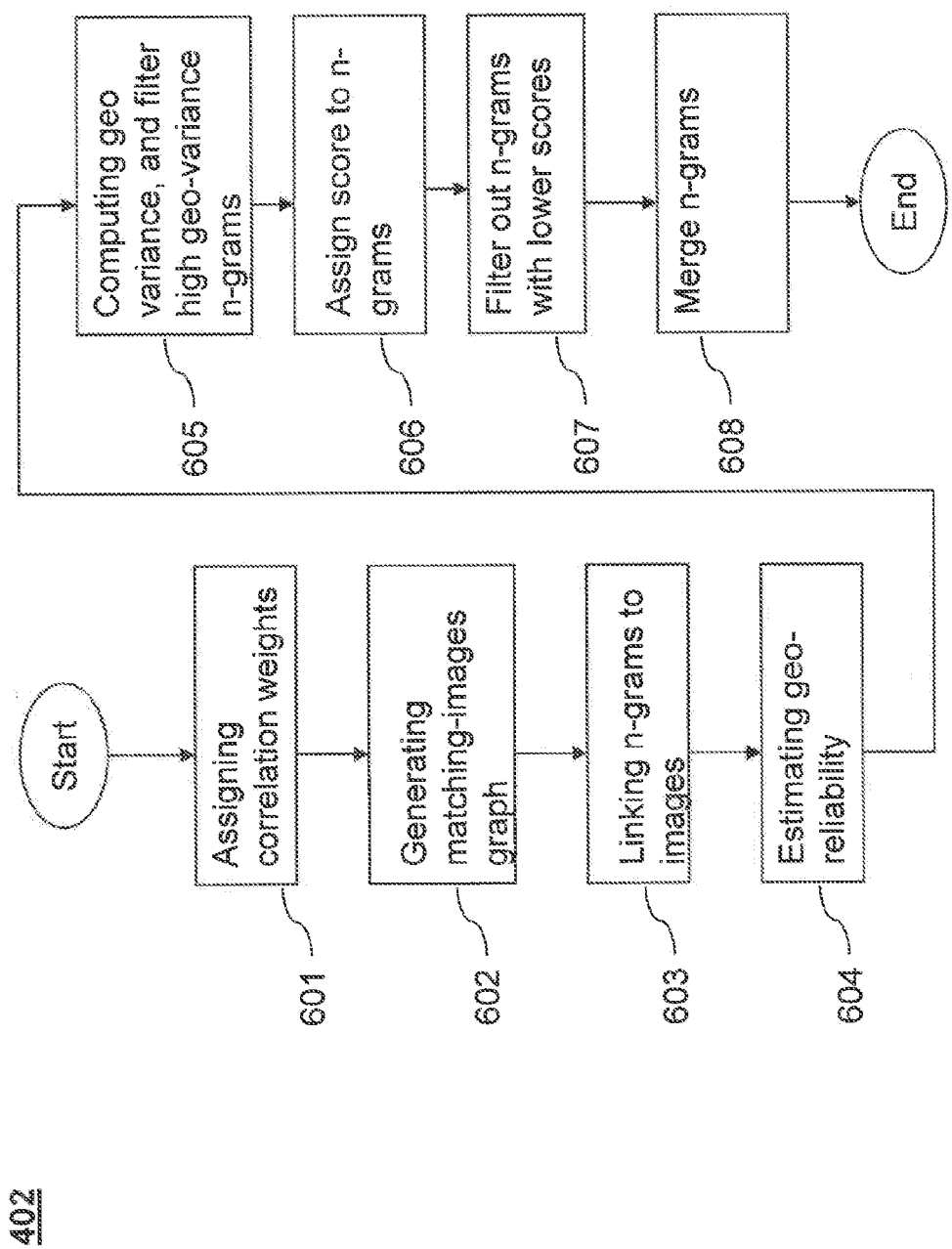
FIG. 6 is a process selecting a set of n-grams from the list of n-grams generated according to the process of FIG. 4, according to an embodiment of the present invention.

In step 504, the list of potential landmark descriptor n-grams remaining after the one or more rules and/or filters are applied in step 503, can be written in n-gram collection 108. The set of n-grams from n-gram collection 108 used by subsequent processing steps, such as processing step 402, is a set of n-grams that have been filtered according to several filters as described above, and would therefore include only n-grams that are substantially descriptive of landmarks FIG. 6 shows steps 601-608 illustrating the processing involved in step 402, according to one embodiment. In step 601, the images associated with the n-grams selected in step 401, are assigned correlation-weights. In one embodiment, the images associated with the n-grams selected in step 401 are copied into text/image collection 107 and the weight assignment and additional processing is performed upon those images. The correlation-weight W(i) of an image I(i) is an inverse measure of the level of correlation of the image I(i) to other images in text/image collection 107. For example, if image I(i) is not correlated with any other images in text/image collection 107, then image I(i) is assigned a correlation-weight of 1; if image I(i) is correlated to 2 other images in text/image collection 107, then image I(i) and each of its two correlated images is assigned a correlation-weight of ⅓. A predetermined set of rules or criteria can be used to determine if two images are correlated. For example, two images can be considered correlated when they are taken by the same author and at very close geo-location (e.g., within ¼ miles from each other).

In step 602, a matching images graph is created from images in, for example, text/image collection 107. Nodes in the matching images graph represents images in text/image collection 107. Each edge in the matching images graph represents the extent to which the images corresponding to the two connected nodes match. For example, the matching score M(i,j) assigned to the edge between images I(i) and I(j), can be a numeric value that is derived based on the match between the feature vector of image I(i) and the feature vector of image I(j). Individual features in the feature vectors may be assigned configurable weights, and the matching score M(i,j) can be the summation of such the weights of the matching features.

In step 603, links (referred to as image-name links) are formed between each of the n-gams in n-gram collection 108 and images in text/image collection 107. The image-name links can be a binary variable set to 1 if the n-gram is contained by the tags of the images and 0 otherwise. However, in order to increase the robustness of the results, the output is smoothed by averaging over a set of images that are visually similar rather than considering single images. For example, image-name link between image I(i) and n-gram k, L(i,k), can be defined as:

$$L(i,k) = \frac{\sum_{\text{for all images } j \text{ with n-gram } k} M(i,j) * W(j)}{\sum_{\text{for all images } j} M(i,j) * W(j)}$$

where, as noted above, M(i,j) is the matching-score between images I(i) and I(j) in the image-matching graph, and W(j) is the correlation weight of image I(j).

In step 604, the geo-reliability of each image in text/image collection 107 is estimated. The geo-reliability of image I(i), G(i), is an estimation of the accuracy of the image's geo-location information, based on a comparison of the visual consistency of images with geo-location coordinates within a predetermined distance to each other. For example, $$G(i) = \frac{\sum_{\text{for n nearest images } j \text{ to image } i} M(i,j) * W(j)}{\sum_{\text{for n nearest images } j \text{ to image } i} W(j)}$$

where, n can be a configurable parameter.

In step 605, a geo-variance can optionally be computed for each n-gram N(k). For example, geo-variance V(k) of N(k) can be expressed as:

$$V(k) = EW[(\text{loc}(i) - EW(\text{loc}(i)))^2]$$

where loc(i) represents the geo-location of image I(i), and EW is the weighted expectation. The weighted expectation is helpful in capturing the variance of the most significant location points for the n-gram. Weights can be computed as L(i, k)*W(i)*G(i), i.e., the product of image-name link, image weight and image's geo-reliability. Subsequently, n-grams with V(k) larger than a threshold geo-variance can be filtered out from the n-gram collection 108.

In step 606, the n-gram score S(k) of each n-gram N(k) in text/image collection 107 is determined using a measure that is designed to capture the internal link strength between images that have n-gram N(k) in its tags, and the external link strength between images that have n-gram N(k) in its tags and images that do not have n-gram N(k) in its tags. For example, S(k) can be expressed as:

$$S(k) = \frac{\sum_{\text{for all image pairs }(i,j)} W(i) * L(i,k) * M(i,j) * L(j,k) * W(j)}{\sum_{\text{for all image pairs }(i,j)} W(i) * L(i,k) * M(i,j) * (1 - L(j,k)) * W(j)}$$

The larger the S(k), the more likely that n-gram N(k) refers to a meaningful, visually distinguishable entity, and therefore more likely to be a landmark name.

In step 607, after the n-grams are scored, a further filtering can optionally be implemented to identify the most popular landmark n-grams. For example, the n-gram scores of a predetermined number of n-grams having the highest n-gram scores can be averaged to determine a threshold-average score. Thereafter, all n-grams other than those n-grams having a score higher than the threshold-average score can be removed from n-gram collection 108.

In step 608, n-grams that are considered to refer to the same landmark location are merged. Although the scoring step, and the subsequent filtering based on scores, generally leaves a list of n-grams that meaningfully refer to landmarks, many n-grams referring to the same landmark can still remain in n-gram collection 108. Multiple n-grams referring to the same landmark can exist because of several reasons including different names for the same landmark, different formulations of the same name, and substring truncation. It would be desirable to merge such duplicate n-grams together in a meaningful manner. To address this, in one example, if two n-grams N(k) and N(l) have their scores within a predetermined distance from each other, and if the images they are linked to are substantially overlapped, then the two n-grams N(k) and N(l) are merged. The substantial overlap of images can be determined, for example, by considering the Bhattacharya distance of L(i,k) for each image I(i) and n-gram N(k) pair, and determining whether the Bhattacharya distance is above a predetermined threshold. The computation of Bhattacharya distance is well-known in the art.

CONCLUSION

The processing functionality of module 127 and/or modules 201-203, can be achieved in software, hardware, or a combination thereof. For example, modules 201 and 203 may be implemented entirely as software modules, or some of the functionality of the appearance model generator module 202 may be implemented using hardware such as a field programmable gate array (FPGA). It will be understood by a person of skill in the art that unsupervised image annotator module 127 and or computer 101 may include additional components and modules that facilitate the functions of the present invention.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for detecting and annotating landmarks in digital images:
   (a) automatically assigning, to one or more images in a plurality of text-associated digital images, a text tag descriptive of a landmark, to generate a set of landmark-tagged images, wherein images in the set of landmark-tagged images are algorithmically determined to include the landmark, wherein the text tag is based upon one or more scored n-grams from one or more texts associated with the one or more images, wherein the n-grams are scored by assigning correlation-weights to the plurality of text-associated digital images, and wherein the landmark identifies an object in or feature marking a geographic point or geographic area;
   (b) learning an appearance model for the landmark from the set of landmark-tagged images; and
   (c) detecting the landmark in a new image using the appearance model,
   wherein said stages (a)-(c) are performed by at least one processor.

2. The method of claim 1, further comprising:
   (d) annotating the new image with the tag descriptive of the landmark.

3. The method of claim 1, wherein stage (a) comprises:
   (i) generating a list of landmark n-grams from the plurality of text-associated digital images;
   (ii) computing an n-gram score for each landmark n-gram in an n-gram set, wherein the n-gram set is a subset of the list of landmark n-grams; and
   (iii) assigning a tag descriptive of a landmark, wherein the tag descriptive of the landmark is based on at least one landmark n-gram in said n-gram set.

4. The method of claim 3, wherein stage (a)(i) comprises:
   electronically accessing the plurality of text-associated digital images; and
   retrieving at least one of said landmark n-grams from a text associated with an image in the plurality of text-associated digital images.

5. The method of claim 3, wherein stage (a)(ii) comprises:
   assigning said correlation weights to the plurality of text-associated digital images, wherein each image in the plurality of text-associated digital images is assigned a correlation weight based on correlation of metadata of said each image with other images in the plurality of text-associated digital images, and wherein the plurality of text-associated digital images includes the set of text-associated images;
   generating a matching-images graph from the plurality of text-associated digital images, wherein each edge in the matching-images graph is assigned a match score representing a level of match between two images connected by said each edge; and
   linking said landmark n-grams to images in the plurality of text-associated digital images based upon said correlation-weights and the matching images graph to generate links between landmark n-grams and images in the plurality of text-associated digital images.

6. The method of claim 5, wherein stage (a)(ii) further comprises:
   estimating a geo-reliability score for each image of the plurality of text-associated digital images using the matching-images graph, wherein the geo-reliability score is an estimation of accuracy of geo-location information of said each image based on a comparison of visual consistency of other images with geo-location coordinates within a predetermined distance to said each image.

7. The method of claim 6, wherein stage (a)(ii) further comprises:
   computing a variance of geo-location for a landmark n-gram of said n-gram set, wherein the variance is based on geo-locations of images linked to said landmark n-gram in said matching-images graph; and
   removing from said n-gram set any landmark n-grams having a variance of geo-location exceeding a predetermined threshold.

8. The method of claim 5, wherein the n-gram score is based on the matching-images graph.

9. The method of claim 8, wherein the n-gram score is computed as a ratio of strength of internal edges of said matching-images graph and the strength of external edges of said matching images graph, wherein an internal edge exists between images having at least one common landmark n-gram, and wherein an external edge exists between images not having at least one common landmark n-gram.

10. The method of claim 5, wherein stage (a)(i) further comprises:
    merging two or more landmark n-grams in said n-gram set based at least on one of,
    a similarity of the score of said two or more landmark n-grams, and
    an overlap of images having said two or more landmark n-grams in linked landmark n-grams.

11. The method of claim 5, wherein the metadata includes information relating to at least one of,
    an author,
    a geo-location, and
    a time of origin.

12. The method of claim 5, wherein each link in the matching-graph represents matching feature descriptors between two images of the plurality of text-associated digital images.

13. A system for automatically detecting and annotating landmarks in digital images, comprising:
- at least one collection of text-associated digital images stored in a memory medium; and
- at least one processor communicatively coupled to said medium, the at least one processor configured to:
  - automatically assign, to one or more images in a plurality of text-associated digital images, a text tag descriptive of a landmark, to generate a set of landmark-tagged images, wherein images in the set of landmark-tagged images are algorithmically determined to include the landmark, wherein the text tag is based upon one or more scored n-grams from one or more texts associated with the one or more images, wherein the n-grams are scored by assigning correlation-weights to the plurality of text-associated digital images, and wherein the landmark identifies an object in or feature marking a geographic point or geographic area;
  - learn an appearance model for the landmark from the set of landmark-tagged images; and
  - detect the landmark in a new image using the appearance model.

14. The system of claim 13, wherein the at least one processor is further configured to:
- annotate the new image with the tag descriptive of the landmark.

15. The system of claim 13, wherein the at least one processor is further configured to:
- generate a list of landmark n-grams from the plurality of text-associated digital images;
- compute an n-gram score for each landmark n-gram in an n-gram set, wherein the n-gram set is a subset of the list of landmark n-grams; and
- assign a tag descriptive of a landmark, wherein the tag descriptive of the landmark is based on at least one landmark n-gram in said n-gram set.

16. The system of claim 15, wherein the at least one processor is further configured to:
- assigning said correlation weights to the plurality of text-associated digital images, wherein each image in the plurality of text-associated digital images is assigned a correlation weight based on correlation of metadata of said each image with other images in the plurality of text-associated digital images, and wherein the plurality of text-associated digital images includes the set of text-associated images;
- generate a matching-images graph from the plurality of text-associated digital images, wherein each edge in the matching-images graph is assigned a match score representing a level of match between two images connected by said each edge; and
- link said landmark n-grams to images in the plurality of text-associated digital images based upon said correlation-weights and the matching images graph to generate links between landmark n-grams and images in the plurality of text-associated digital images.

17. A non-transitory computer readable storage medium having computer program logic recorded thereon for enabling a processor to name images, said computer program logic comprising:
- a first module configured to enable the processor to assign, to one or more images in a plurality of text-associated digital images, a text tag descriptive of a landmark, to generate a set of landmark-tagged images, wherein images in the set of landmark-tagged images are algorithmically determined to include the landmark, wherein the text tag is based upon one or more scored n-grams from one or more texts associated with the one or more images, wherein the n-grams are scored by assigning correlation-weights to the plurality of text-associated digital images, and wherein the landmark identifies an object in or feature marking a geographic point or geographic area;
- a second module configured to enable the processor to learn an appearance model for the landmark from the set of landmark-tagged images;
- a third module configured to enable the processor to detect the landmark in a new image using the appearance model.

18. The non-transitory computer readable storage medium of claim 17, further comprising:
- a fourth module configured to enable the processor to annotate the new image with the tag descriptive of the landmark.

19. The non-transitory computer readable storage medium of claim 17, wherein the first module is further configured to:
- generate a list of landmark n-grams from the plurality of text-associated digital images;
- compute an n-gram score for each landmark n-gram in an n-gram set, wherein the n-gram set is a subset of the list of landmark n-grams; and
- assign a tag descriptive of a landmark, wherein the tag descriptive of the landmark is based on at least one landmark n-gram in said n-gram set.

20. The non-transitory computer readable storage medium of claim 19, wherein the first module is further configured to:
- assigning said correlation weights to the plurality of text-associated digital images, wherein each image in the plurality of text-associated digital images is assigned a correlation-weight based on correlation of metadata of said each image with other images in the plurality of text-associated digital images, and wherein the plurality of text-associated digital images includes the set of text-associated images;
- generate a matching-images graph from the plurality of text-associated digital images, wherein each edge in the matching images graph is assigned a match score representing a level of match between two images connected by said each edge; and
- link said landmark n-grams to images in the plurality of text-associated digital images based upon said correlation-weights and the matching images graph to generate links between landmark n-grams and images in the plurality of text-associated digital images.

* * * * *